April 9, 1957     J. H. WILLIAMSON ET AL     2,788,228
VEHICLE DRAFT DEVICE WITH LOAD ADJUSTING MEANS
Filed Dec. 4, 1953
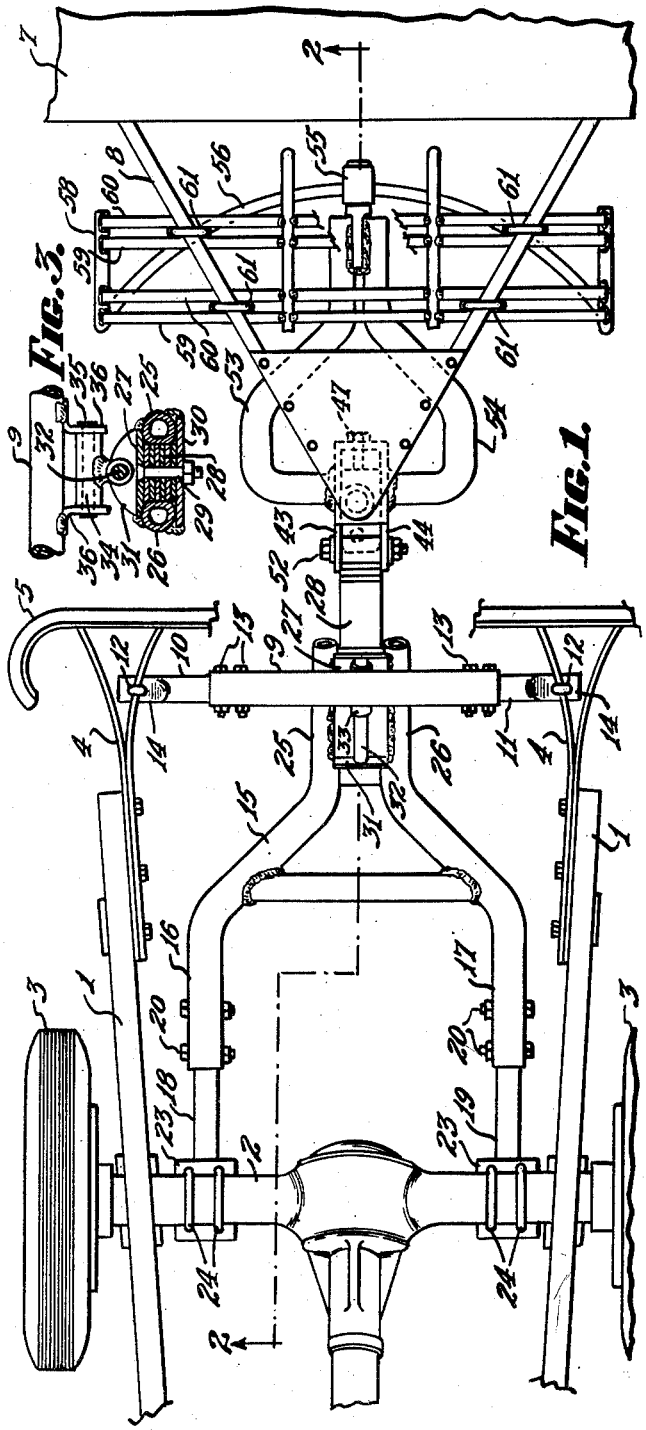
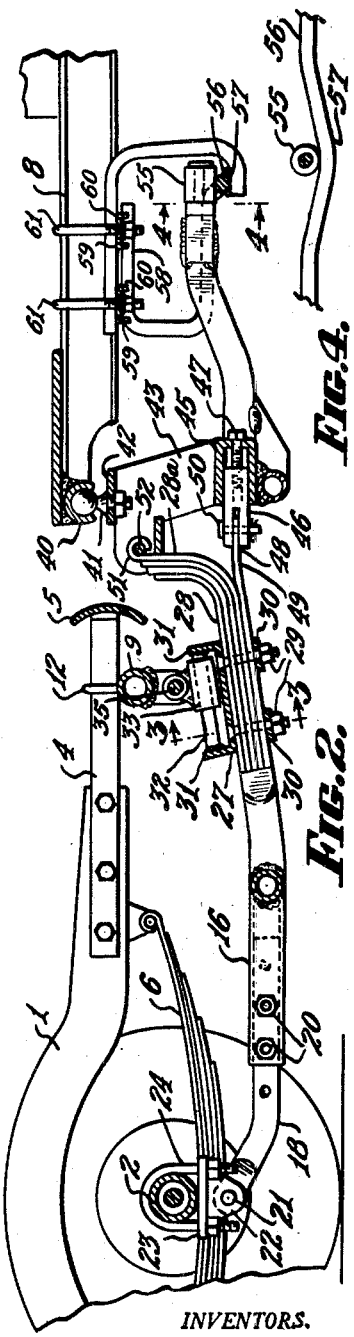
INVENTORS.
JAMES H. WILLIAMSON
AND PAUL R. SHIVELY,
BY
Allen & Allen
ATTORNEYS.

2,788,228

VEHICLE DRAFT DEVICE WITH LOAD ADJUSTING MEANS

James H. Williamson, Spencerville, and Paul R. Shively, Auglaize County, Ohio

Application December 4, 1953, Serial No. 396,249

6 Claims. (Cl. 280—489)

Our invention relates to trailer hitches and more particularly to a trailer hitch in which the weight of the trailer is distributed between the axle of the trailer and the rear axle of the towing vehicle, instead of on the frame of the towing vehicle.

When a house trailer is attached to a car with an ordinary trailer hitch, the weight of the trailer is carried by the car frame with the result that the back end of the car goes down and the front end comes up. Weight is thus taken from the front wheels and put on the rear axle housing and wheels. This causes the body of the car to act as a teeter-totter over the rear axle, thus subjecting the car to strains and stresses for which it was not designed. Steering of the car is made difficult and the car has a decided tendency to swing and sway sidewise—known as side thrust or side jerk.

It is a principal object of our invention to provide a trailer hitch which eliminates the difficulties enumerated above by providing a construction in which the weight of the trailer is removed from the frame of the towing vehicle and distributed between the axle of the trailer and the rear axle of the towing vehicle.

It is a further object of our invention to provide a trailer hitch which eliminates swing, sway and teeter-tottering in the towing vehicle.

It is a further object of our invention to provide a trailer hitch which permits the frame and springs of the towing vehicle to function in the normal manner with all four wheels of the vehicle firmly placed on the road at all times, with no side thrust on the front wheels.

It is a still further object of our invention to provide a trailer hitch which will fit all standard makes and models of cars and trailers and which is built to withstand roughest treatment.

It is a still further object of our invention to provide a trailer hitch which eliminates the need for helper springs on the towing vehicle, thus eliminating the hard-riding qualities of the vehicle when the trailer is not attached.

These and other objects of our invention which will appear hereinafter or which will be apparent to the skilled worker in the art upon reading these specifications, we accomplish by that construction and arrangement of parts of which we shall now describe an exemplary embodiment.

Reference is now made to the accompanying drawings wherein:

Figure 1 is a plan view, with parts broken away showing our novel trailer hitch.

Figure 2 is a sectional view taken along the line 2—2 of Figure 1.

Figure 3 is a sectional view taken along the line 3—3 of Figure 2.

Figure 4 is a sectional view taken along the line 4—4 of Figure 2.

Briefly, in the practice of our invention, we provide a trailer hitch in which the hitch serves, in essence, as an extension of the trailer tongue and serves to support the trailer tongue from the rear axle of the towing vehicle instead of from the rear bumper and frame thereof. Thus the weight of the trailer is effectively distributed between the axle of the trailer and the rear axle of the towing vehicle. While the hitch serves as an extension of the trailer tongue, the arrangement of parts is such that the trailer may be maneuvered in the usual manner, the trailer tongue pivoting relative to the hitch so that the trailer may be turned in the usual space, with the trailer following the car. The hitch also permits the trailer to be attached and detached from the car in a few moments without special tools.

Referring now to Figure 1 of the drawings, we have therein illustrated a towing vehicle having a frame 1, a rear axle housing 2, rear wheels 3, and bumper brackets 4 fixed to the frame 1 and supporting a bumper 5. The frame 1 is supported above the rear axle housing by means of springs 6, in the usual fashion.

The trailer is indicated generally at 7 and includes a forwardly extending trailer tongue 8 adapted to be secured to the towing vehicle. It will be understood that the tongue 8 is secured to the frame of the trailer, the trailer frame in turn being supported on one or more pairs of wheels inetrmediate the ends thereof.

Our hitch comprises essentially two parts, a first part adapted to be secured to the towing vehicle, and a second part adapted to be secured to the trailer, the two parts being connected together to form the complete hitch. As best seen in Figure 1, the part connected to the towing vehicle comprises a tubular cross arm 9 having extensions 10 and 11 which are secured by means of U-bolts to the bumper brackets 4. The extensions 10 and 11 are arranged to telescope in the cross arm 9 and hence may be accommodated to the particular car to which the hitch is attached. The cross arm 9 will be centered between the bumper brackets and the extensions 10 and 11 will be fixedly secured to the cross arm 9 by means of the bolts 13. The ends of the extensions 10 and 11 will be preferably flattened, as at 14; and the flattened ends will be formed off center so that they may be rotated one half turn to raise or lower the cross arm assembly.

Suspended beneath the cross arm 9 is a forked draw bar 15 having spaced apart arms 16 and 17 into the tubular ends of which are fitted draw bar extensions 18 and 19, the extensions being adjustable axially of the arms 16 and 17 and secured thereto in the desired position by means of bolts 20. The free ends of the extensions 18 and 19 are pivotally connected, as at 21, to the vertical flanges 22 of plates 23 secured to the rear axle housing 2 by means of U-bolts 24. At its opposite end the draw bar 15 terminates in spaced apart neck portions 25 and 26 which are secured together by means of a bracket 27 having its opposite side edges welded or otherwise fixedly secured to the neck portions 25 and 26.

A spring assembly 28 is fitted between the neck portions 25 and 26 and fastened by means of bolts 29 extending downwardly through the bracket 27 and the spring assembly 28. The spring assembly is supported from beneath on cross straps 30 which underlie the springs and extend between the neck portions 25 and 26 to which they are preferably welded or otherwise permanently secured. The bolts 29 pass through the cross straps 30, thereby clamping the springs between bracket 27 and straps 30.

The bracket 27 is provided at its opposite ends with flanges 31 between which extends a rod 32 slidably carrying a sleeve 33. A second sleeve 34 extends normally of the sleeve 33 and is fixedly secured thereto, there being a pin 35 extending through the sleeve 34 and supported at its ends by brackets 36 depending from the cross bar 9, in the manner best seen in Figure 3 of the drawings. The draw bar 15 is thus supported at its neck end by the supporting means just described which serves as a pivoted slide, the sleeve 33 sliding along the rod 32 as the draw bar assembly is pivoted relative to the rear axle of the towing vechile about pivot points 21.

The trailer tongue 8 is provided at its forward end with a socket 40 adapted to receive hitch ball 41 secured to a hitch ball support comprising cross member 42 supported on the upper edges of the spaced apart vertically disposed plates 43 and 44 which in turn are supported on channel member 45. A clevis 46 is fitted in channel member 45 and is adjustable in the channel by means of the adjustment bolt 47. The slotted end 48 of the clevis is adapted to receive the draw tongue 49, the draw tongue 49 being secured in the slot 48 by means of coupler pin 50. As shown, the draw tongue 49 comprises the lowermost leaf in the spring assembly 28; and the remaining spring elements may be turned upwardly in the manner illustrated in Figure 2, the undermost spring 28a being looped at its end, as at 51, and secured between the plates 43 and 44 by means of auxiliary coupling pin 52.

A pair of arms 53 and 54 extend rearwardly from the hitch ball support, in the manner illustrated, the arms coming together at their ends and carrying a roller 55 adapted to contact the curved track or rail 56 suspended from the trailer tongue. It will be evident that since the arms 53 and 54 are fixed to the hitch ball support, the arms are also fixed relative to the draw bar 15 and act as an extension of the draw bar, thereby in effect supporting the end of the draw bar on the track 56.

The trailer 7, through its tongue 8, will pivot relative to the hitch ball and hence relative to the draw bar and the arms 53 and 54. In so pivoting, the ends of the arms 53 and 54 carrying roller 55 will move along the curved track 56 and hence will be supported in any relative position of the draw tongue and trailer tongue. The curved rail 56 is formed as the arc of a circle having the vertical axis of the hitch ball 41 as its center and having a radius equal to the horizontal distance between the axis of the hitch ball and the roller 55. Thus, irrespective of movement of the trailer tongue relative to the draw tongue and its extension, the roller 55 will remain in contact with the rail 56 and thereby support the draw bar.

As best seen in Figure 4, the rail 56 will be V-shaped at its center, as indicated by reference numeral 57, so that the trailer tongue will be normally maintained in alignment with the towing vehicle.

The rail 56 is suspended from a supporting device 58 comprising spaced apart pairs of tracks 59 and 60 arranged to slidably receive the U-bolts 61 by means of which the supporting device is secured to the trailer tongue. It will be evident that the slidable connection between the tracks 59 and 60 and the U-bolts 61 permit accommodation of the device to any conventional trailer tongue irrespective of its size.

In the use of our device, the draw bar assembly is attached to the towing vehicle and the hitch ball support including arms 53 and 54 and roller 55, and the track 56 and its supports, are secured to the trailer tongue. The towing vehicle is then backed to the trailer and the trailer tongue lifted to raise the base of the hitch to the proper height so that the auxiliary pin 52 can be passed through the loop 51 of the spring elements 28a. Similarly, the draw tongue 49 is inserted in the slot 48 of the clevis 46 and the coupling pin 50 passed therethrough, thereby hitching the trailer to the towing vehicle.

In order to insure proper adjustment of the hitch, the height of the bumper from the ground should be measured before the trailer is hitched to the towing vehicle. Then, after the trailer is hitched, the adjustment bolt 47 will be drawn up or backed off, as the case may be, until the height of the bumper is the same as it was prior to the attachment of the trailer. As the adjustment bolt 47 is tightened, thereby drawing the clevis 46 rearwardly, the draw bar assembly will be caused to move upwardly, pivoting about the pivot points 21. The upward movement of the draw bar assembly permits the sleeve 33 to slide rearwardly along the rod 32, thereby permitting the cross arm 9 to move upwardly and thereby relieve the forces pulling the car frame downwardly. It will be evident that when the bumper (and hence the frame) of the car is in its normal position with the trailer hitch in place, the weight of the trailer will be borne by and distributed between the axle of the trailer and the rear axle of the towing vehicle, instead of on the frame of the towing vehicle.

Modifications may be made in our invention without departing from the spirit of it. Having, however, described our invention in an exemplary embodiment, what we desire to secure and protect by Letters Patent is:

1. A trailer hitch comprising a draw bar adapted to be supported at one end from the rear axle housing of the towing vehicle, said draw bar terminating at its opposite end in a spring assembly, a hitch ball support detachably secured to said spring assembly for receiving the hitch ball socket of a trailer tongue, said spring assembly comprising a plurality of flat spring elements at least one of which is turned upwardly at its end and detachably secured to said hitch ball support, another of said spring elements extending rearwardly to form a draw tongue, said hitch ball support including adjustable means for detachably receiving said draw tongue, said hitch ball support having a rearwardly extending arm secured thereto, and a track adapted to be suspended from the trailer tongue for contact by the free end of said arm.

2. The structure claimed in claim 1 wherein said upturned spring element terminates in a loop, and wherein said hitch ball support includes spaced apart members between which the looped end of said spring element is detachably secured by means of a hitch bolt extending through said loop and openings in said spaced apart members.

3. The structure claimed in claim 1 wherein said adjustable means comprises a clevis secured to said hitch ball support by means of an adjustment bolt.

4. A trailer hitch comprising a forked draw bar adapted to be pivotally supported at its forked end from the rear axle housing of the towing vehicle, a cross arm assembly adapted to be attached to the rear bumper brackets of the towing vehicle, a sliding connection between said cross arm assembly and the opposite end of said draw bar, a hitch ball support detachably secured to the said opposite end of the draw bar for receiving the hitch ball socket of a trailer tongue, said hitch ball support having a rearwardly extending arm secured thereto, and a track adapted to be suspended from the trailer tongue for contact by the free end of said arm.

5. The structure claimed in claim 4 wherein said track is secured to a frame having pairs of spaced apart rails between which U-bolt assemblies are adapted to slide, whereby said track may be adjustably secured to the trailer tongue.

6. A trailer hitch formed in two parts adapted to be detachably secured together, said first part comprising a draw bar adapted to be supported at one end from the rear axle housing of the towing vehicle, a cross arm assembly for supporting said draw bar adjacent its opposite end, said cross arm assembly being slidably connected to said draw bar, spring means at the said opposite end of said draw bar, said second part comprising a hitch ball support, means for detachably securing the said hitch ball support to said spring means, said hitch ball support being otherwise free from attachment to the towing vehicle, said hitch ball support having a rearwardly extending arm secured thereto, and a track adapted to be suspended from the trailer tongue for contact by the free end of said rearwardly extending arm.

References Cited in the file of this patent

UNITED STATES PATENTS

| | | |
|---|---|---|
| 1,607,786 | Winsor et al. | Nov. 23, 1926 |
| 2,110,114 | Smith | Mar. 1, 1938 |
| 2,517,047 | Spitler | Aug. 1, 1950 |